(12) United States Patent
Hattori et al.

(10) Patent No.: US 7,334,194 B2
(45) Date of Patent: Feb. 19, 2008

(54) TEXT EDITING APPARATUS

(75) Inventors: Yohichi Hattori, Yokohama (JP); Seiji Yamada, Ebina (JP); Takahito Hosokawa, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 10/668,889

(22) Filed: Sep. 23, 2003

(65) Prior Publication Data
US 2004/0064791 A1 Apr. 1, 2004

(30) Foreign Application Priority Data
Sep. 26, 2002 (JP) .............................. 2002-281314

(51) Int. Cl.
*G06F 3/00* (2006.01)
(52) U.S. Cl. ..................... 715/804; 715/530; 715/853
(58) Field of Classification Search ............. 715/784, 715/785, 786, 788, 530, 781, 840, 853, 803, 715/804
See application file for complete search history.

(56) References Cited

U.S. PATENT DOCUMENTS

| | | | | |
|---|---|---|---|---|
| 5,553,216 A * | 9/1996 | Yoshioka et al. | ............ | 715/515 |
| 5,572,642 A * | 11/1996 | Nasu | ........................... | 345/418 |
| 6,448,985 B1 * | 9/2002 | McNally | ..................... | 715/784 |
| 6,738,787 B2 * | 5/2004 | Stead | ....................... | 707/104.1 |
| 6,948,125 B2 * | 9/2005 | Detweiler et al. | .......... | 715/713 |
| 6,961,909 B2 * | 11/2005 | Lord et al. | ................... | 715/853 |
| 7,079,166 B1 * | 7/2006 | Hong | ......................... | 715/777 |
| 7,117,450 B1 * | 10/2006 | Chaudhri | ..................... | 715/787 |
| 7,228,496 B2 * | 6/2007 | Hamada | ..................... | 715/513 |
| 2001/0014899 A1 * | 8/2001 | Fujikawa | .................... | 707/513 |
| 2004/0187081 A1 * | 9/2004 | Petz | .......................... | 715/526 |

FOREIGN PATENT DOCUMENTS

| | | |
|---|---|---|
| JP | 01-149164 | 6/1989 |
| JP | 03-084661 | 4/1991 |
| JP | 04118743 A | 4/1992 |
| JP | 06259312 | 9/1994 |
| JP | 07-282054 | 10/1995 |
| JP | 07-295980 | 11/1995 |
| JP | 08171562 | 7/1996 |
| JP | 10-021260 | 1/1998 |
| JP | 11-191106 | 7/1999 |
| JP | 2002236584 | 8/2002 |

* cited by examiner

*Primary Examiner*—Kieu D. Vu
(74) *Attorney, Agent, or Firm*—Daniel P. McLoughlin; Hoffman, Warnick & D'Alessandro LLC

(57) ABSTRACT

It is one object of the present invention to improve the text editing operation provided by document creation application software. A text editing apparatus that is implemented by a computer under the control of document creation application software comprises: a document data controller for controlling a process for editing target document data read from a memory; and a document display controller for displaying a document, on a predetermined display device, based on the document data read by the document data controller, wherein, for each section constituting the document data, the document display controller provides a display area, and in accordance with the size of the display area, displays part of the document in the section.

14 Claims, 9 Drawing Sheets

| FIELD NAME | FIELD ATTRIBUTE | FIELD VALUE |
|---|---|---|
| SECTIONID | Integer | 11 |
| SECTIONTITLE | String | "1.1 WHAT IS THE ABC FUNCTION?" |
| SECTIONPARENTID | String | 1 |
| SECTIONNESTEDLEVEL | Integer | 2 |
| SECTIONSTATUS | Integer | 0 |
| SECTIONSTARTLINE | Integer | 1 |
| SECTIONENDLINE | Integer | 100 |
| NUMOFSECTIONLINES | Integer | 100 |
| SECTIONBORDERCOLOR | String | "blue" |
| SECTIONINDICATIONCOLOR | String | "red" |
| SECTIONNAVIGATORMARKREQUIRED | Boolean | true |
| SECTIONNAVIGATORMARKCOLOR | String | "red" |
| SECTIONNAVIGATORMARKINTERVAL | Integer | 10 |
| SECTIONCLOSEBUTTONREQUIRED | Boolean | false |

FIG.6

TEXT EDITING APPARATUS

REFERENCE TO PRIOR APPLICATION

The current application claims the benefit of Japanese Application No. JP2002-281314, filed on Sep. 26, 2002, which is hereby incorporated herein by reference.

BACKGROUND OF THE INVENTION

1. Technical Field

The present invention relates to a text display and editing system using a computer, and in particular to a system characterized by a text display and editing function.

2. Background Art

Included in the text display and editing functions (hereinafter a function related to text display and editing is referred to simply as a "text editing function") provided by current application software, such as LOTUS NOTES (TM), provided by IBM Corp., are a function for managing text in a predetermined area (hereinafter referred to as a "section") either by the closing of the section on the display (hiding text on the display) or by the expansion of the section (making the text in the section visible), and a function for setting properties for each section. Sections can be hierarchically nested (assembled to form a nested structure).

FIG. 9 is a specific diagram showing a text editing screen provided by LOTUS NOTES.

As is shown in FIG. 9, to perform a function to close or open the section, a mouse pointer is positioned on start line (hereinafter referred to as a "title line") 901 of the text in a section. In this case, title line 901 actually works as a command button, and in accordance with the event that occurs when the command button is clicked, the section is either closed or opened. Further, to make it simple for a user to identify the display state of a section, mark 902, located at the beginning (the left end) of title line 901, is employed to indicate whether the section has been closed or opened.

By using a property setting function, the type and the color of a border line displayed between sections can be selected, and whether the entire sections should be closed or opened can be designated as the initial display state of the section. For these setups, a desired setup state can be selected from a menu presented on a text display screen, or a separately provided, predetermined setup screen can be employed.

In this example, the text editing function employed for LOTUS NOTES has been described. However, even though there are noticeable differences in the mounting designs, a similar text editing function is provided by various other text editors and document creation application software, such as word processors. For this function, instead of using a section title line as a command button, a button object displayed near the title line is used to instruct the omission or expansion of text.

However, the text editing functions provided for conventional document creation application software present certain operating inconveniences. For example, a section can not be partially displayed; and when a document includes multiple sections or multiple nested sections, the relationships existing among the individual sections tend to be difficult to identify.

It is one object of the present invention to improve the text editing operation provided by document creation application software.

It is another object of the present invention to provide document creation application software for which a tool is supplied that improves the text editing operation.

SUMMARY OF THE INVENTION

To achieve these objects, the present invention can be implemented as the following text editing apparatus. The text editing apparatus comprises: a document data controller for controlling a process for editing target document data read from a memory; and a document display controller for displaying a document, on a predetermined display device, based on the document data read by the document data controller, wherein, for each section constituting the document data, the document display controller provides a display area, and in accordance with the size of the display area, displays part of the document in the section.

In one embodiment, the document display controller further includes the following function. When a part of the document for a predetermined section is displayed in a corresponding display section, the document display controller provides a display that clearly indicates a portion of the display area has not yet been displayed. Further, at an arbitrary location in a display area (preferably, the lowermost portion of the display area) for a section that is opened and displayed, the document display controller displays a command button for entering a command to close the display of the section. In addition, for the display area for the section that has been opened and displayed, the document display controller displays a mark indicating the section has been opened and giving the range of the expansion.

In another embodiment, the text editing apparatus further comprises: a section navigator screen display controller for generating a section navigator screen visualizing the structure of the document data in that area read by the document data controller, and for displaying the section navigator screen on the display device.

Furthermore, to achieve the above objects, the present invention can be implemented as the following display control method that permits a computer to display a document on a predetermined display device. The display control method comprises the steps of: accepting an instruction for changing the size of a display area for a section constituting a document that currently is displayed on the predetermined display device; moving, in accordance with the instruction, a document segment located above or under the section; and displaying, in a display area for which the size has been changed by moving the document segment, a document segment for a section in accordance with the number of display lines that are available. Additionally, the display control method can further comprise a step of: in the display area wherein the document segment for the section is displayed, presenting a mark indicating that the section has been opened and giving the range of the expansion.

The present invention also can be implemented as a program that permits a computer to perform the functions of the above described text editing apparatus.

The program can be provided by being stored on a magnetic disk, an optical disk or another recording medium or in a semiconductor memory, or by being distributed across a network.

BRIEF DESCRIPTION OF THE DRAWINGS

FIG. 6 is a diagram showing an example structure for a section control table according to still another embodiment of the invention;

DETAILED DESCRIPTION OF THE INVENTION

An illustrative embodiment of the present invention will now be described in detail while referring to the accompanying drawings.

Figure 1:
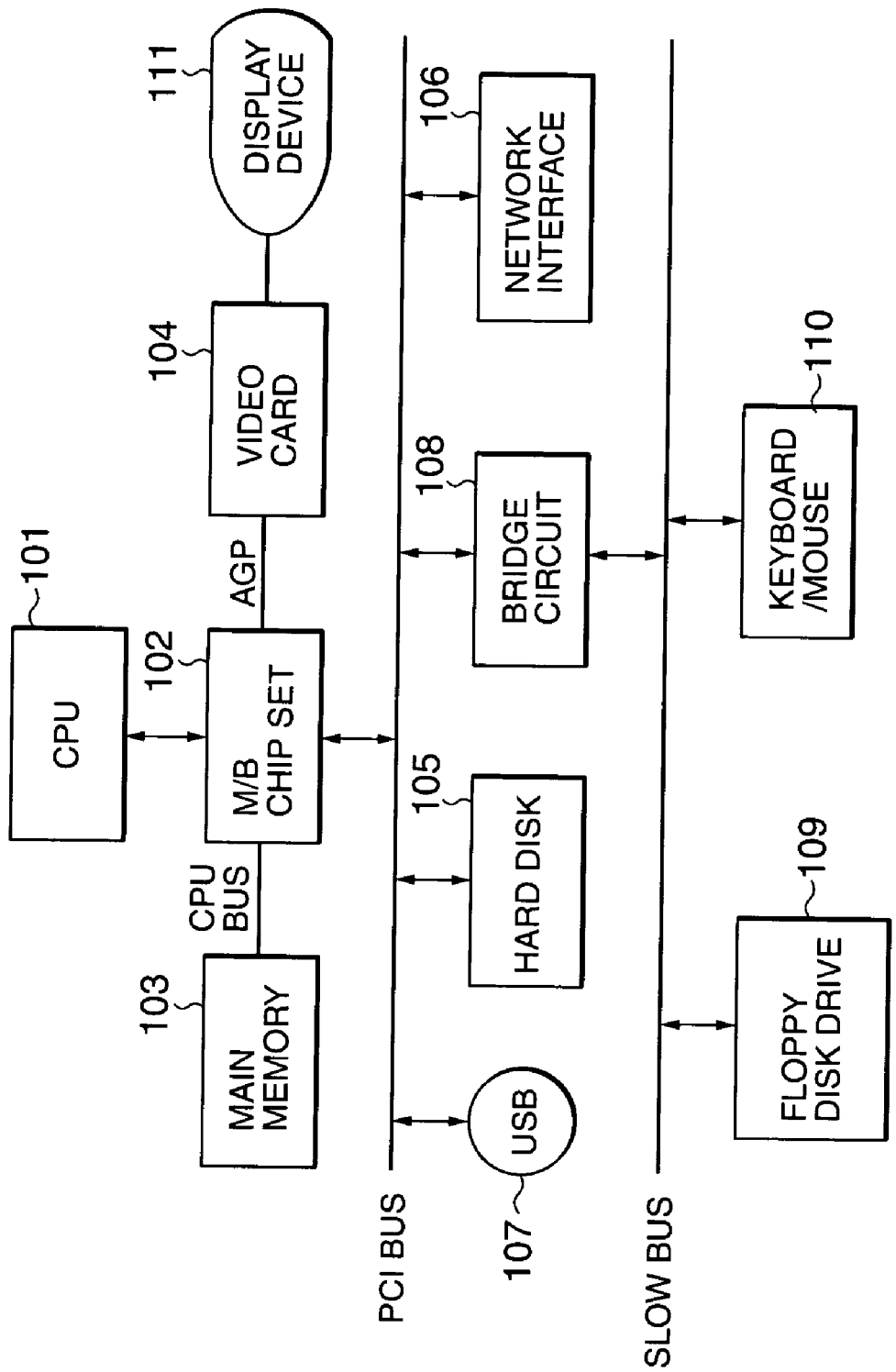
FIG. 1 is a specific diagram showing an illustrative hardware configuration, according to one embodiment of the present invention, for an appropriate computer for executing document creation application software.

FIG. 1 is a specific diagram showing an illustrative hardware configuration for an appropriate computer that executes document creation application software according to one embodiment of the invention.

The computer in FIG. 1 comprises: CPU (Central Processing Unit) 101, which comprises arithmetic operation means; main memory 103, which is connected to CPU 101 through M/B (motherboard) chip set 102 and a CPU bus; video card 104, which is also connected to CPU 101 through M/B chip set 102 and an AGP (Accelerated Graphics Port); hard disk 105, network interface 106 and USB port 107, all of which are connected to M/B chip set 102 by a PCI (Peripheral Component Interconnect) bus; floppy disk drive 109 and keyboard/mouse 110, which are connected to M/B chip set 102 by a slow bus, such as an ISA (Industry Standard Architecture), bridge circuit 108 and the PCI bus; and display device 111, which is connected to video card 104 and which displays images generated by video card 104.

It should be noted, however, that the hardware configuration for the computer in FIG. 1 is merely an example that implements one embodiment of the invention, and that various other configurations can be employed so long as they permit application of the invention. For example, instead of video card 104, only a video memory may be mounted and image data may be processed by CPU 101, or a drive for a CD-ROM (Compact Disk Read Only Memory) or a DVD-ROM (Digital Versatile Disc Read Only Memory) may be provided through an interface such as an ATA (AT Attachment).

Figure 2:
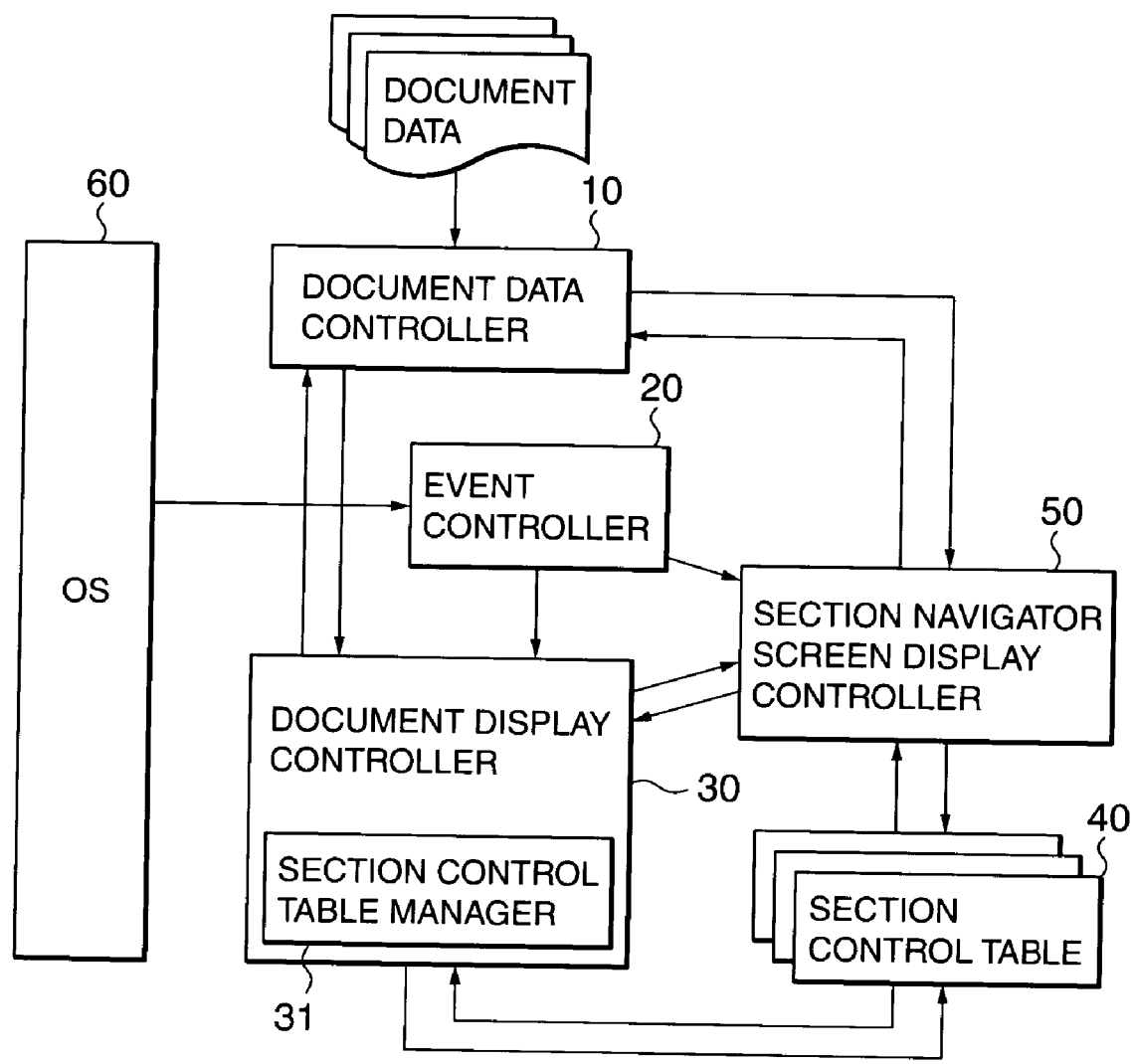
FIG. 2 is a diagram showing the software configuration for a text editing system implemented by the computer in FIG. 1 according to another embodiment.

FIG. 2 is a diagram showing the software configuration of a text editing system, according to one embodiment of the invention, that is implemented by the computer shown in FIG. 1.

Hereinafter, an explanation for one embodiment will be given for which it is assumed that a user interface, similar to the one provided by LOTUS NOTES, is to be extended.

As is shown in FIG. 2, the text editing system of the embodiment comprises: document data controller 10, for managing document data and controlling the processing performed for the document data; event controller 20, for performing a process in accordance with the occurrence of an input event; document display controller 30, for controlling the display of the document data and permitting the editing of the text; section control table 40, for managing information related to a section used for displaying the document data; and section navigator screen display controller 50, for controlling the display of a section navigator screen, which will be described later.

Document data controller 10, event controller 20, document display controller 30 and section navigator screen display controller 50 can be virtual software blocks implemented by CPU 101 using an extended program in main memory 103 as shown in FIG. 1. It should be noted that, to implement the above functions, this program can be executed by operating system (OS) 60.

The program that permits CPU 101 to perform these functions is provided by being stored on a magnetic disk, an optical disk or another recording medium or in a semiconductor memory, or by being distributed across a network. In one embodiment, by using network interface 20, floppy disk drive 109 in FIG. 1 or a CD-ROM drive (not shown), the program is introduced and stored on hard disk 105. Then, the program is read from hard disk 105 and extended to main memory 103, where it is executed by CPU 101 and the functions of the components in FIG. 2 are performed.

With this arrangement, a document file to be edited is read and the data therein (hereinafter referred to as "document data") are edited by document data controller 10. Document data controller 10 also manages information related to the structure of the document data. And when, for example, there are multiple document data sections, document data controller 10 manages the information related to these sections (including the information for a hierarchical structure when the sections are nested). The document file to be edited may be stored on a predetermined storage device, such as hard disk 105 shown in FIG. 1, or it may be obtained across a network. The document file is selected and stored as an editing target in main memory 103 and is then read and processed by document data controller 10.

Event controller 20 monitors the occurrence of an event resulting from the manipulation of an input device, such as keyboard/mouse 110 shown in FIG. 1. When a predetermined event has occurred, an event notification is forwarded by event controller 20 to the functional blocks (document display controller 30 and section navigator screen display controller 50) that perform a corresponding process. It should be noted that, for the display of text, the sorting of an event to a window on display device 111 (the determination of the window for which the event has occurred) is performed under the control of OS 60.

Document display controller 30 displays a window on display device 111, displays the document in the window based on the document data read by document data controller 10, and forms a display area for the entire document. Further, upon the reception of a notification from event controller 20, document display controller 30 provides overall control for the processing performed to display the document. The operation performed to display the document under the control of document display controller 30 is reported to document data controller 10 and is regarded as the editing process for the document data, and the results are reflected to the document data. In one embodiment, document display controller 30 can be especially characterized by the control process performed to display a section. A detailed description of this process will be presented later.

Furthermore, document display controller 30 includes, as an internal sub-system, section control table manager 31. During the process performed by document display controller 30 to display the section, contents of a section control table 40 are updated, as needed, by section control table manager 31.

Section control table 40 includes a data structure used for managing the display state of a section in a document displayed by document display controller 30 and for managing the setup (property) information related to the display of the section, and is prepared in main memory 103 in FIG. 1 as the document is displayed by document display controller 30. Together with the detailed process performed by document display controller 30, the structure of section control table 40 and the details of the information to be managed will be described later.

Section navigator screen display controller 50 displays a section navigator screen on display device 111. And upon the reception of the notification from event controller 20, section navigator display controller 50 performs a process in accordance with an instruction entered by a user at the section navigator screen. The section navigator screen is a screen on which information, related to the section of the document that is displayed, is visually presented on display device 111 by document display controller 30. The structure of the section navigator screen will be explained later.

The display control for a document according to one embodiment will now be described in detail while referring to a specific document display example.

In one embodiment, a characteristic process for the display of a section is performed in order to improve the text editing operation. Specifically, in one embodiment, the control provided for a section display area (the range), the addition of a section closing button, the addition of an area indicating line for a section, and the creation of a section navigator screen are performed.

In order to display a document on display device 111, document display controller 30 in one embodiment controls a display area for each section that is set for the document. Specifically, for each section, document display controller 30 not only hides or displays the entire document for the section by closing or opening the section, but also sets an area having a predetermined size and displays only a part of the section.

Figure 3:
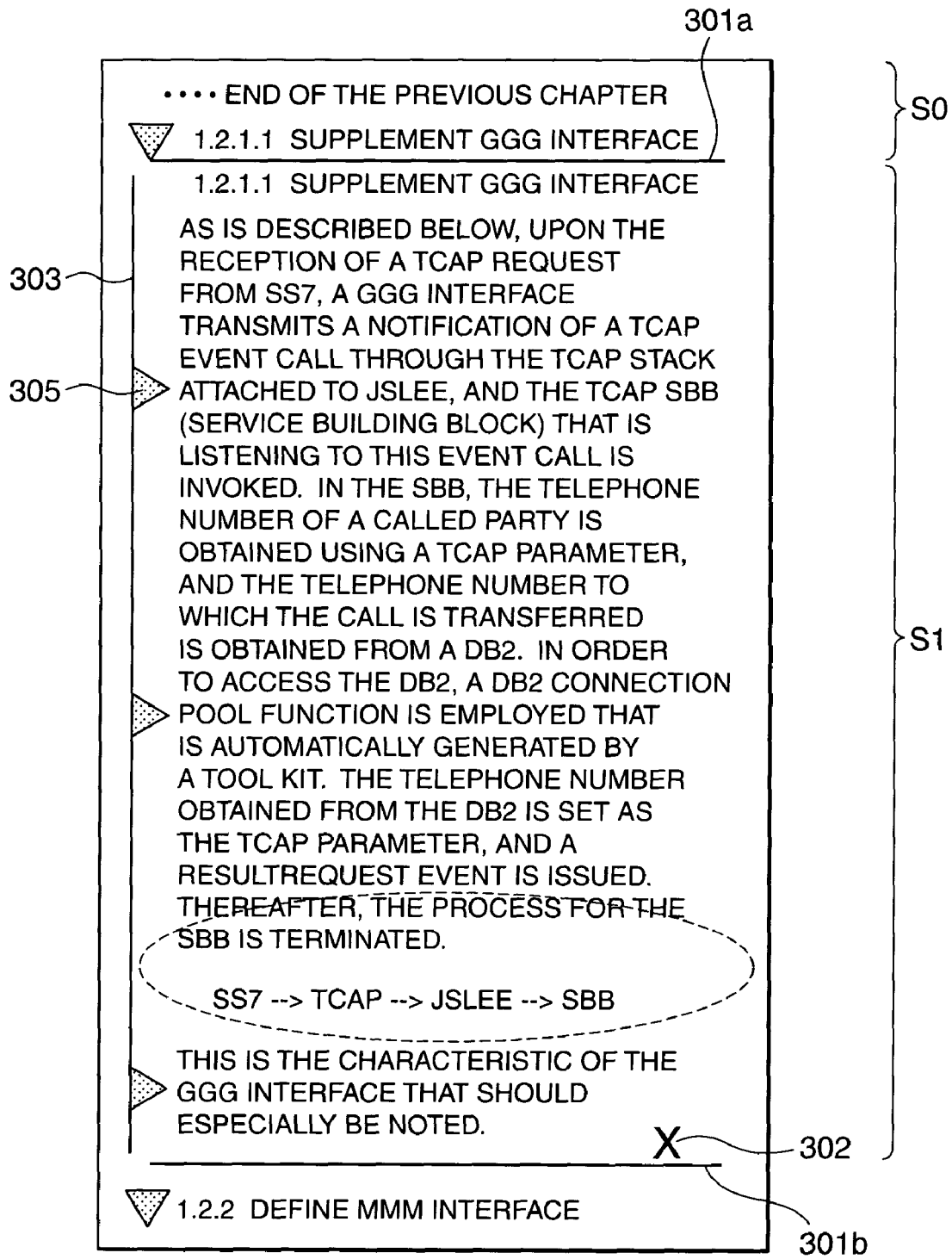
FIG. 3 is a diagram showing the state wherein, under the control of a document display controller for this embodiment, a predetermined document is displayed in a window presented on a display device.
Figure 4:
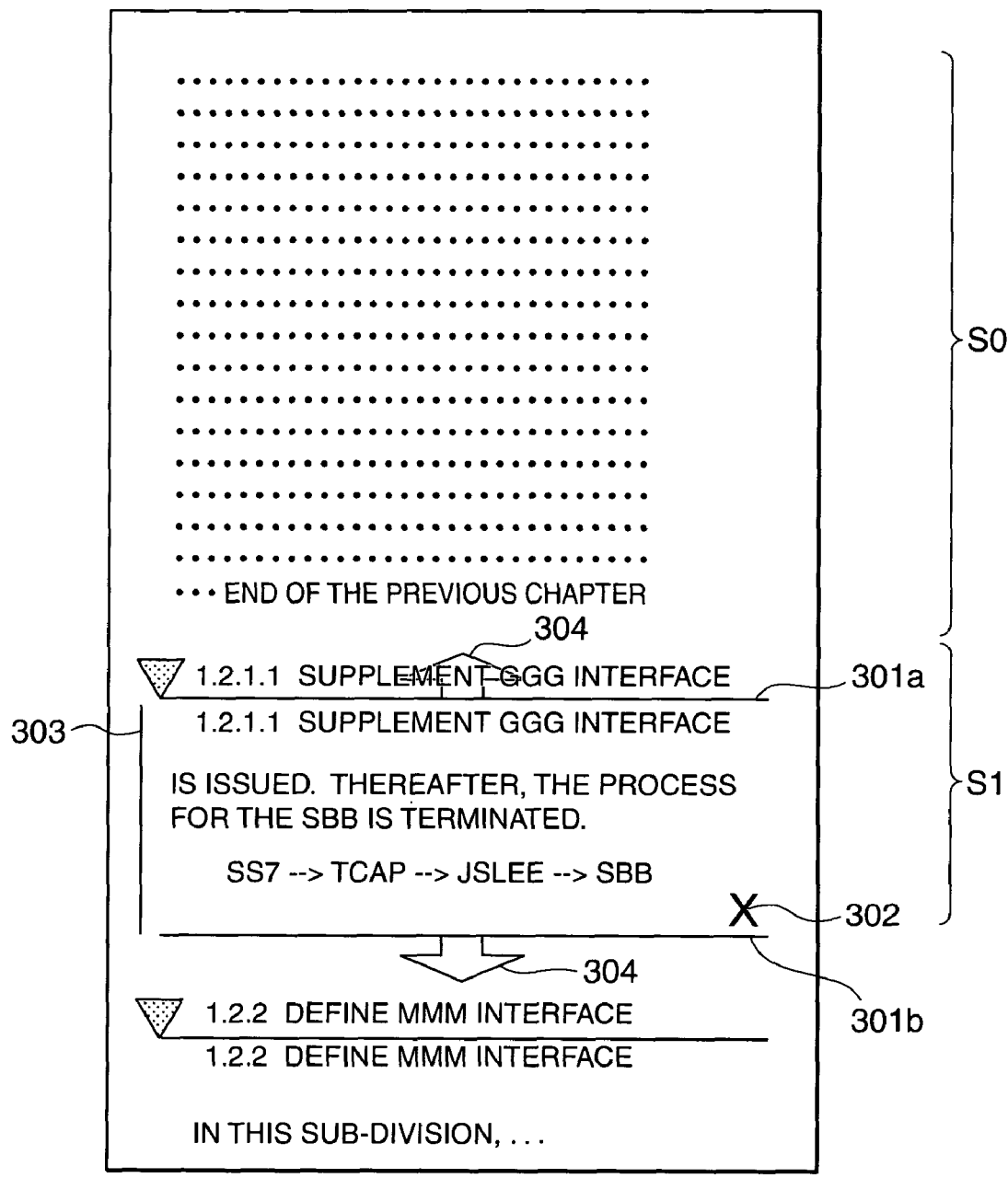
FIG. 4 is a diagram showing the state wherein the size of a display area is reduced for a section S1 of a document.

FIG. 3 is a diagram showing the state wherein a predetermined document is displayed in a window on display device 111 controlled by document display controller 30, and FIG. 4 is a diagram showing the state wherein a display area for section S1 in the document in FIG. 3 is reduced.

Assume that, of the expanded section S1 of the document, as shown in FIG. 3, only the portion enclosed by a broken line is to be displayed in accordance with the size of the display screen of display device 111 and the size of the document included in section S1, and its positional relationships relative to other sections. In this case, as is shown in FIG. 4, only the desired portion of the document is displayed by reducing the display area for section S1, and the size of another area, such as immediately preceding area S0 in the example, can be increased on the display screen. Section border lines 301 are displayed at the border lines of the sections to clarify them visually. And in the following explanation, the state wherein the document segment in the section is not closed, including the state wherein the section is partially displayed, is referred to as "opened."

Further, as is shown in FIGS. 3 and 4, document display controller 30 displays command button 302 at the bottom portion of the display area for each section, which permits the entry of a command for closing the display of the corresponding section. Conventionally, the title line of the section is employed as command button 302 in order to close or open the display of the section. However, for an opened section which has many lines of the text, e.g., for a section that covers several pages of the screen, in order to close the section after the user has browsed a document, the user must scroll the window and return to the head of the section, and then use the mouse to click on the title line. Therefore, to avoid this troublesome operation, command button 302 is located at the bottom portion of the display area of a section, so that a user who has read this section can close the display of the section without changing the display state. Even when the section is nested, so long as command button 302 is located at the bottom portion of each of the sections, only a section for which the clicking of command button 302 is performed will be closed.

In addition, for the display area of a section that is opened, document display controller 30 displays a mark indicating that the pertinent section has been opened, and giving the range of this opened section. Specifically, as is shown in FIGS. 3 and 4, section area indicating line 303 is displayed along the display area of the section, e.g., along the left edge. By referring to this line 303, a user can easily identify the section that currently is opened. When the section is nested and when the display of section area indicating line 303 is overlapped, the screen would be complicated. Therefore, in order to easily identify sections that have been opened, section area indicating line 303 is displayed only for the outermost opened section, or the display color is changed in accordance with the hierarchical level of a corresponding section.

In one embodiment, a section navigator screen is provided in order to improve the text editing operation. On the section navigator screen, the structure of a document displayed on display device 111 is visualized as a tree structure in which each section is employed as a unit. Therefore, when sections are nested, the hierarchical level of each section is used to represent the depth of the tree structure.

The section navigator screen is generated by document display controller 30 and is displayed on display device 111. It should be noted that the section navigator screen may be displayed in an area of a window on display device 111 that has been prepared for the display of a document, or in another window.

Figure 5:
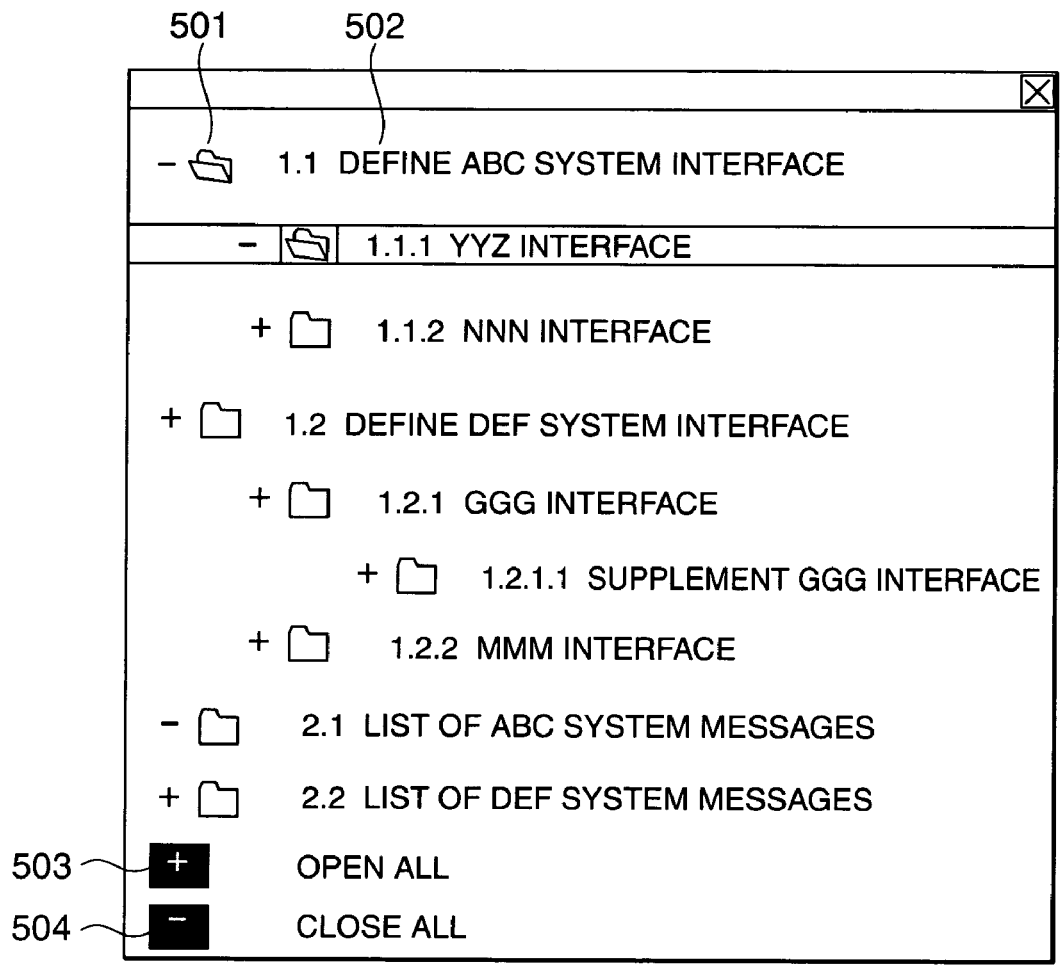
FIG. 5 is a diagram showing an illustrative section navigator screen according to yet another embodiment of the invention.

FIG. 5 is a diagram showing an illustrative section navigator screen.

As is shown in FIG. 5, on the section navigator screen, a section is represented by using image icon 501 and words in title line 502, and the structure of a document that employs the sections as constituent units is represented by using a tree structure wherein pairs of image icons 501 and the words in title lines 502 are employed as nodes. For each node, a mark is provided to indicate whether a section corresponding to the node is closed or opened (in the example in FIG. 5, a mark "−", to the left of image ion 501, means opened, and a mark "+", means closed). Image icon 501 can also be changed, depending on whether the corresponding section is opened or closed.

Further, when a cursor for text editing is located at a predetermined position on the document displayed on display device 111, a different color can be used for the display of the node corresponding to the included section. In this manner, it is easy to understand where the section that is currently being edited is located in the document.

While referring again to FIG. 5, two command buttons 503 and 504, "open all" and "close all," are provided at the lower portion of the section navigator screen. When either command button 503 or 504 is clicked on using the mouse, all the sections of the document can be collectively opened or closed. Further, when several nodes of the displayed tree structure have been selected and command button 503 or 504 is clicked on, only the sections corresponding to the selected nodes will be collectively opened or closed. That is, not only section navigator screen display controller 50 but also document display controller 30 are notified of an event that has occurred due to these manipulations. Section navigator display controller 50 updates the section navigator screen in accordance with the manipulations, and document display controller 30 opens or closes the corresponding sections on the displayed document.

FIG. 6 shows an illustrative structure for section control table 40 used to manage the display state of a section of the document presented by document display controller 30, and the display state of the section navigator screen presented by section navigator screen display controller 50.

Section control table 40 for managing the display state information is set for each section of the document. And in order to manage the display state of a document segment in a corresponding section, the following control information is registered in each section control table 40.

section opened or closed state
  start line for displaying the section area
  end line for displaying the section area
  the number of lines in the section area Further, in order to manage the setup (property) information related to the display of the section, the following attribute information is also registered.

color of the section border lines
  color of the section area indicating lines
  display/non-display of a section navigator mark
  color of the section navigator mark on display
  interval between the section navigator marks on display
  display/non-display of a section closing command button It should be noted that the section navigator mark will be described later.

These attributes are related to which setup entry is provided for a user, and depend on the mounting condition. Depending on the entry, the information may be retained for each section, or the information may be retained as a global setup entry for the entire document.

While referring to FIG. 6, in section control table 40, field names representing entries to be managed for the individual sections, and the attributes and the values of the fields are stored in correlation with each other.

In the example in FIG. 6, "SECTION ID", "SECTIONTITLE", "SECTIONPARENTID", "SECTIONNESTEDLEVEL", "SECTIONSTATUS", "SECTIONSTARTLINE", "SECTIONENDLINE", "NUMOFSECTIONLINES", "SECTIONBORDERCOLOR", "SECTIONINDICATIONCOLOR", "SECTIONNAVIGATORMARKREQUIRED", "SECTIONNAVIGATORMARKCOLOR", "SECTIONNAVIGATORMARKINTERVAL" and "SECTIONCLOSEBUTTONREQUIRED" are set as the fields names.

"SECTIONID" comprises ID information for specifying a section and a unique value with one document. Its field attribute is an integer (Integer), and in the example in FIG. 6, the field value is "11".

"SECTIONTITLE" represents the title of a section. Its field attribute is a character string (String), and in the example in FIG. 6, the field value is character string "1.1. What is the ABC function?"

"SECTIONPARENTID" is ID information for a parent section when a section is nested. Its field attribute is a character string, and in the example in FIG. 6, the field value is "1". When a parent section does not exist, a special value, e.g., "0", can be set.

"SECTIONNESTEDLEVEL" represents the nesting level of a section. When there is no nesting, the level is "1", and when there is nesting, the level is incremented by one as the hierarchical level descends. The field attribute is an integer, and in the example in FIG. 6, the field value is "2".

"SECTIONSTATUS" represents the opened or closed status of a section, with "0" indicating "closed", "1" indicating "opened" and "2" indicating "partially displayed". The field attribute is an integer, and in the example in FIG. 6, the field value is "0", i.e., the pertinent section (section ID=11, and title "1.1. What is the ABC function?") is currently closed.

"SECTIONSTARTLINE" designates the start line number for a section that is displayed, and for each section the line numbers are counted. When a section is opened, a "1" is registered, and when a section is partially displayed, the line number of the first line of the portion of the section that is displayed is registered. For example, when for a section having a total of 100 lines the 20th line through the 70th line portion is displayed, the value registered is 20. In the example in FIG. 6 the field attribute is an integer, and the field value is "1".

"SECTIONENDLINE" represents the last line number of a section. When the section is partially displayed, the line number of the last line in the portion of the section that is displayed is registered. For example, when for a section having a total of 100 lines the 20th line through the 70th line portion is displayed, the value registered is 70. In the example in FIG. 6 the field attribute is an integer, and the field value is "100".

"NUMOFSECTIONLINES" represents the number of lines included in a section. In the example in FIG. 6 the field attribute is an integer, and the field value is "100".

"SECTIONBORDERCOLOR" represents the color of section border line 301. In the example in FIG. 6 the field attribute is a character string, and the field value is "blue", i.e., section border line 301 is displayed in blue.

"SECTIONINDICATIONCOLOR" represents the color of section area indicating line 303. In the example in FIG. 6 the field attribute is a character string, and the field value is "red", i.e., section area indicating line 303 is displayed in red.

"SECTIONNAVIGATORMARKREQUIRED" represents the display or non-display of a section navigator mark on section area indicating line 303. In the example in FIG. 6 the field attribute is a Boolean value, and the field value is true, i.e., the section navigator mark is displayed.

"SECTIONNAVIGATORMARKCOLOR" designates the display color for the section navigator mark on the section area indicating line 303. In the example in FIG. 6 the field attribute is a character string, and the field value is "red", i.e., the section navigator mark is displayed in red.

"SECTIONNAVIGATORMARKINTERVAL" designates the interval for the section navigator marks on the section area indicating line 303. In the example in FIG. 6 the field attribute is an integer, and the field value is "10", i.e., every 10 lines a section navigator mark is displayed.

"SECTIONCLOSEBUTTONREQUIRED" designates the display or non-display of section closing command button 302. In the example in FIG. 6 the field attribute is a Boolean value, and the field value is "false", i.e., command button 302 is not displayed.

An explanation will now be given for the processing performed by document display controller 30 and section navigator screen display controller 50 upon receiving an instruction to display a document on display device 111.

1. Closing and Opening of a Section Area

When a closed section of a document displayed on display device 111 is to be opened under the control of document display controller 30, a user clicks on the title line of the pertinent section with the mouse. Thereafter, event controller 20 detects the occurrence of this event and transmits a notification to document display controller 30. Upon the reception of the notification from event controller 20, document display controller 30 moves the document segment displayed below the title line, on which the mouse was clicked, downward and displays, in the vacant space, the document segment in the section corresponding to the title line. Then, section area indicating line 303 is displayed for the display area of the opened section. Document display controller 30 further instructs section control table manager 31 to update the information in section control table 40 related to the pertinent section.

To close the opened section, the user clicks on the title line of the section, or on section closing command button 302, with the mouse. Event controller 20 detects the occurrence of this event, and transmits a notification to document display controller 30. Upon the reception of the notification from event controller 20, document display controller 30 erases the document segment in the section for which the title line or command button 302 was clicked on, and moves, to a position immediately under the title line of the section, the document segment displayed below the section. Further, document display controller 30 instructs section control table manager 31 to update the information in section control table 40 related to the pertinent section.

2. Control of the Display Area for a Section

Assume that, on the document display screen (window) in FIG. 3, the user performs an operation to reduce the size of the display area of section S1, so that only the portion enclosed by a broken line can be displayed.

In this case, the user employs the mouse pointer to point to and drag section border line 301 displayed at the border of the display area of section S1. Event controller 20 detects the occurrence of an event due to the dragging and transmits a notification to document display controller 30. Upon the reception of the notification from event controller 20, document display controller 30 moves section border line 301 in accordance with the dragging. Further, in accordance with the shifting of section border lines 301a and 301b, document display controller 30 moves the document segment above section border line 301a, displayed in the upper portion of section S1, and the document segment below section border liner 301b, displayed in the lower portion of section S1 (see FIG. 4).

Since through this operation the size of the display area of section S1 is reduced, the display (the number of lines) of the document in section S1 is limited. Then, based on the distances section border lines 301a and 301b are shifted and the size of the character font for the document on display, document display controller 30 calculates the number of lines that can be displayed in the display area of section S1, and presents in the display area, in accordance with this number of lines, the document for section S1. Further, document display controller 30 instructs section control table manager 31 to set the values for the start line and the last line in the entries for the pertinent section in section control table 40.

When the section is partially displayed due to the reduction in the display area of the section, as is shown in FIG. 4, mark 304 can be displayed, or the color of section border line 301 can be changed, so that clear notification can be provided for a user of the presence of a portion that is not shown in the display area.

Figure 7:
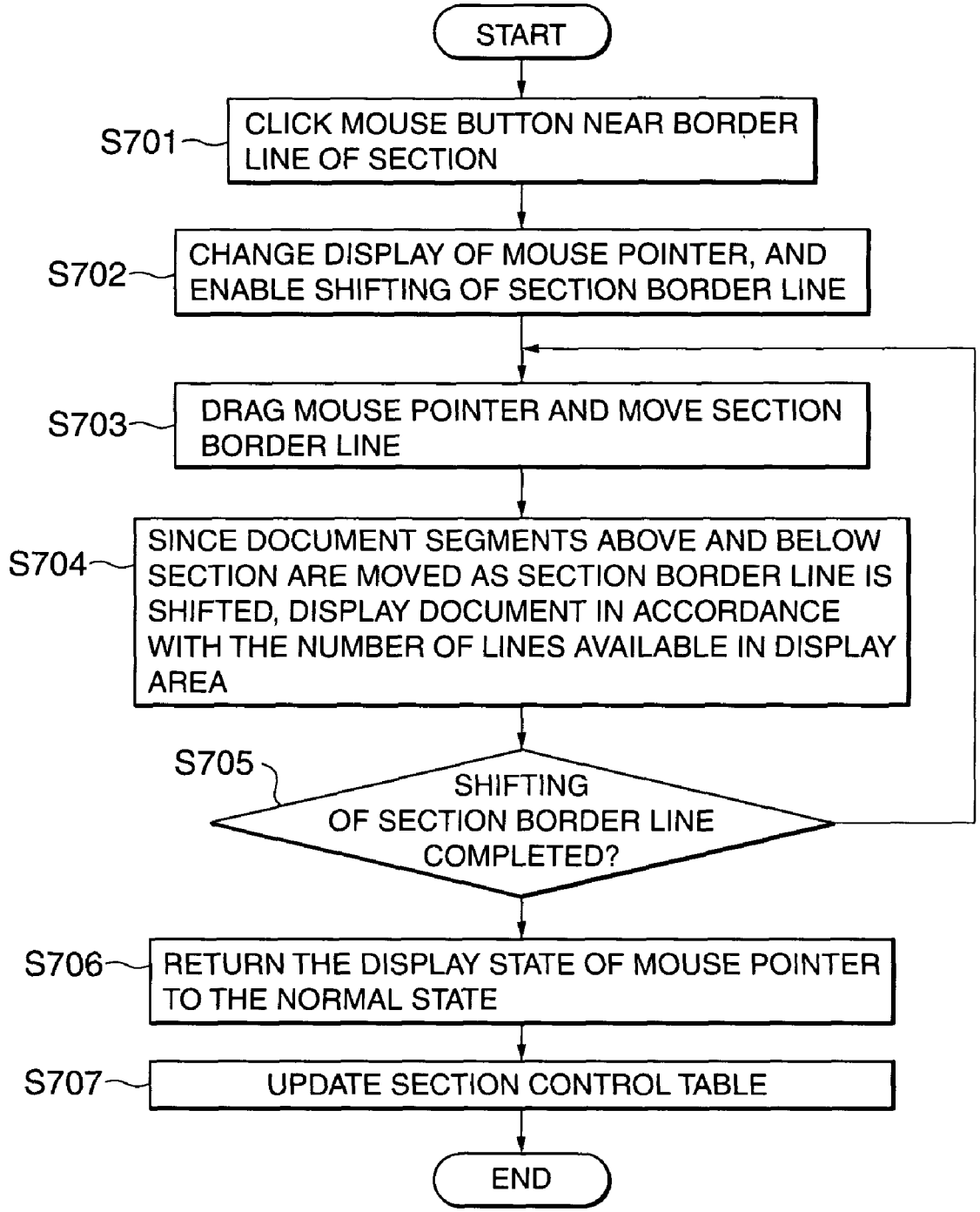
FIG. 7 is a flowchart for explaining the processing for reducing the size of a display area for a predetermined section in a document presented on a display device according to one embodiment of the invention.
Figure 8:
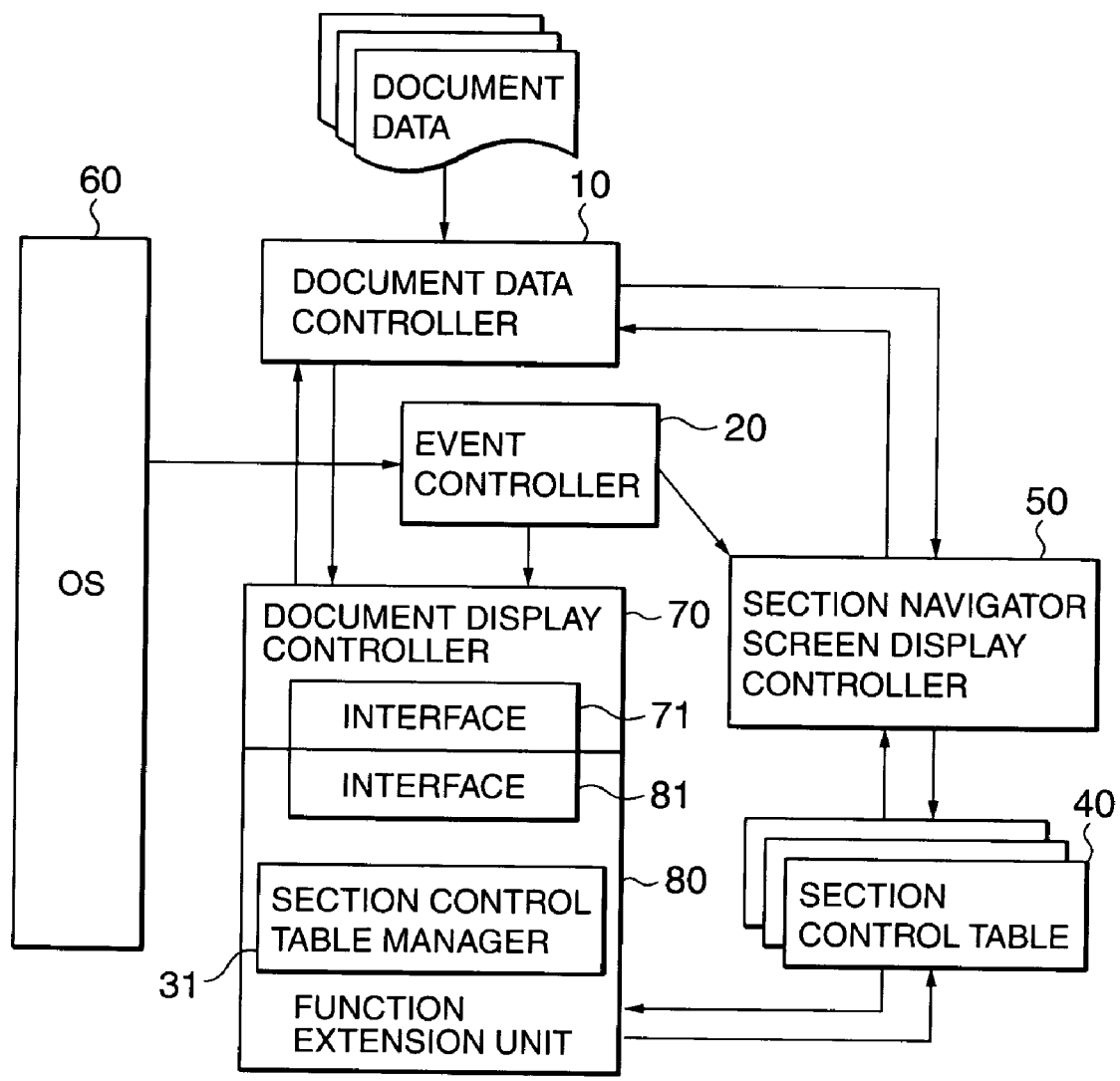
FIG. 8 is a diagram showing another illustrative structure for the text editing system according to one embodiment of the invention.
Figure 9:
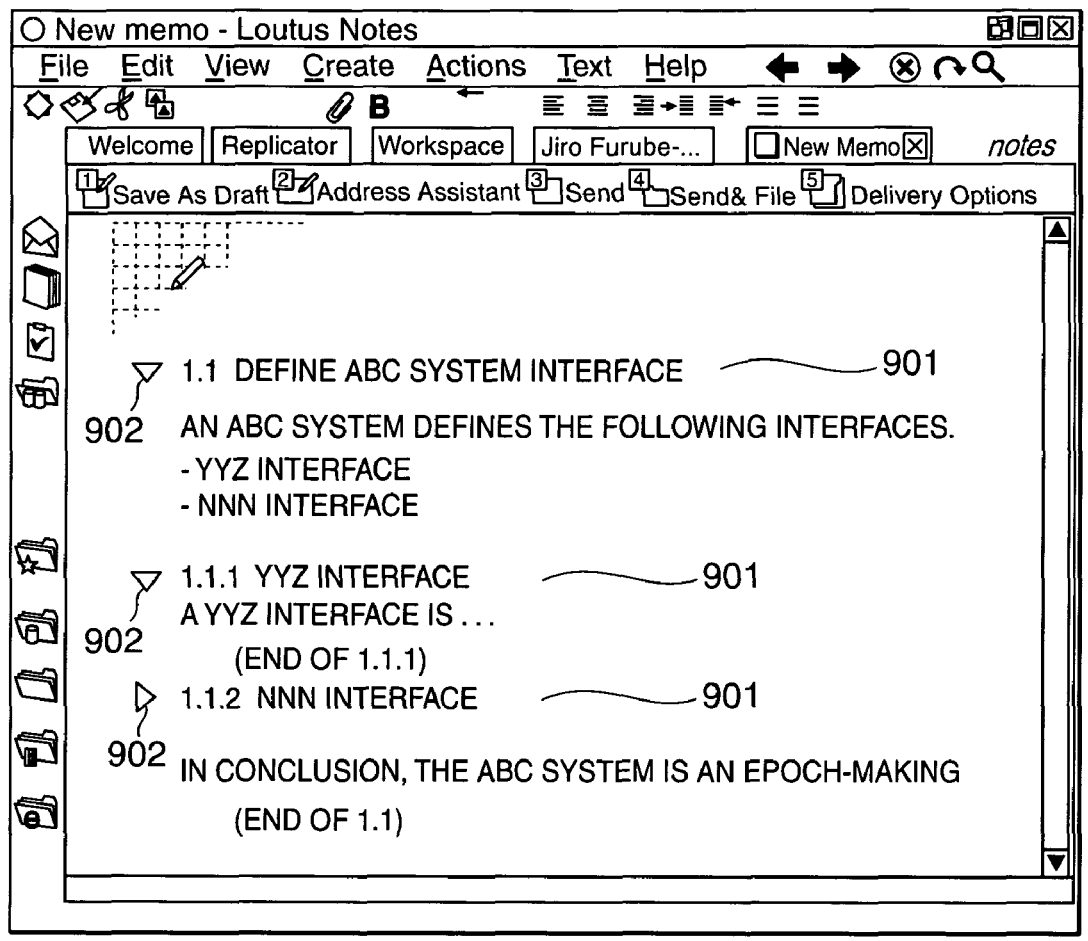
FIG. 9 is a specific diagram showing a text editing screen for LOTUS NOTES.

FIG. 7 is a flowchart for explaining the processing performed to reduce the size of the display area of a predetermined section for a document displayed on display device 111.

As is shown in FIG. 7, when the user clicks on the mouse button near the border of a desired section (e.g., on section border line 301) (step 701), event controller 20 detects this manipulation and transmits a notification to document display controller 30. The display of the mouse pointer is changed, and section border line 301 is set up for shifting (step 702).

Then, when the user moves section border line 301 by dragging it with the mouse pointer (step 703), event controller 20 detects this manipulation and transmits a notification to document display controller 30. The document segment above or below the section is moved as section border line 301 is shifted, and once the size of the available display area has been changed, the number of document lines that will fit therein are displayed (step 704).

When the shifting of section border line 301 is completed (when the mouse button is released), the display of the mouse pointer is returned to the original display state (steps 705 and 706). Document display controller 30 then permits section control table manager 31 to update section control table 40 of the section (step 707).

3. Display of a Section Navigator Screen

When the section navigator screen for a document displayed on display device 111 is to be presented under the control of document display controller 30, the user clicks on section area indicating line 303 with the mouse. Event controller 20 detects the occurrence of an event due to the clicking and transmits a notification to document display controller 30. Upon the reception of the notification from event controller 20, document display controller 30 instructs section navigator screen display controller 50 to generate a section navigator screen for the document data, and to present the screen on display device 111. As is shown in FIG. 3, section navigator marks 305 may be arranged at predetermined intervals, and the section navigator screen may be displayed by clicking on section navigator mark 305 instead of section area indicating line 303.

Event controller 20 notifies section navigator screen display controller 50 of the detection of the manipulation event performed for the section navigator screen. Upon the reception of the notification, section navigator screen display controller 50 updates the presentation of the section navigator screen in accordance with the manipulation. Further, document display controller 30 updates the display state of the document based on the instruction issued by section navigator screen display controller 50, which is consonant with the operation performed on the section navigator screen. Document display controller 30 also instructs section control table manager 31 to update the entries in section control table 40 for the pertinent section.

In the above explanation, when a user employs a pointing device, such as a mouse, to click on or to drag an object, this manipulation is detected as an event and is employed as an operation start condition. However, when a predetermined command is selected from a menu in a window displayed on display device 111 by document display controller 30, or from a drop-down menu provided by manipulating the mouse under the control of OS 60, this selection may be detected as an event and the above processing may be started.

Furthermore, in the above processing, based on the properties managed in section control table 40, document display controller 30 determines the display colors of section border line 301 and section area indicating line 303, and the display color and the arrangement interval for the section navigator marks.

In one embodiment, command button 302 has been displayed in the lowermost portion of the display area of the section by document display controller 30; however, command button 302 can be displayed at any other location so long as command button 302 can be easily operated by a user. For example, when the size of the display area in a document display window for a predetermined section is equivalent to several pages, which are presented on display device 111 by document display controller 30 or 70, command button 302 may be displayed at intervals of an appropriate number of lines.

In addition, in one embodiment, section area indicating line 303 has been displayed to indicate that the section is opened and the range of the opened section. However, the color of a background in the display area of the opened section may be changed, for example, in order to clearly indicate that the section is opened.

As is described above, according to the present invention, the text editing operation can be improved for document creation application software.

Further, according to the present invention, document creation application software can be provided that includes a tool for improving the text editing operation.

What is claimed is:

1. A text editing apparatus comprising:
   a document data controller for controlling a process for editing document data read from a memory, the document data including a plurality of sections;
   a document display controller for displaying a document, in a window on a display device, based on said document data; and
   a section navigator screen display controller for generating a section navigator screen, distinct from the window, for visualizing a structure of said document data, and for displaying said section navigator screen on said display device,
   wherein, for each section in the plurality of sections, said document display controller controls a display area in the window, and in accordance with a size of said display area, displays part of said document in said section.

2. The text editing apparatus according to claim 1, wherein, when a part of said document for a predetermined section is displayed in a display area in the section, said document display controller provides a display that clearly indicates a portion of said display area has not yet been displayed.

3. The text editing apparatus according to claim 1, wherein, at an arbitrary location in a display area for a section that is opened and displayed, said document display controller displays a command button for entering a command to close the display of said section.

4. The text editing apparatus according to claim 3, wherein the command button is located in a lowermost portion of the display area for the section.

5. The text editing apparatus according to claim 1, wherein, for said display area for said section that has been opened and displayed, said document display controller displays a message stating said section has been opened and giving a range of an expansion.

6. The text editing apparatus according to claim 1, wherein, based on manipulations performed for said section navigator screen, generated by said section navigator screen display controller, said document display controller changes a display condition for a section provided corresponding to an instruction for said currently displayed document.

7. The text editing apparatus according to claim 1, wherein the section navigator screen display controller displays the section navigator screen in response to an event detected in the window.

8. The text editing apparatus according to claim 1, wherein the window includes an indicator of a border between two adjacent sections.

9. The text editing apparatus according to claim 8, wherein a user can adjust the size of the display area of at least one of the two adjacent sections using the indicator.

10. A program product stored in a computer readable medium that, in order to implement predetermined functions, permits a computer to function as:
    document data control means for reading, from a memory, document data to be edited, and for editing said document data upon the reception of an editing instruction, the document data including a plurality of sections;
    document display control means for displaying a document in a window on a display device based on said document data, for controlling a display area for each section in the plurality of sections in the window, and for limiting the display of said document for each section in accordance with a size of said display area; and
    section navigator display control means for generating a section navigator screen, distinct from the window, to visualize a structure of said document data as a tree structure in which the plurality of sections are employed as nodes, and for displaying said section navigator screen on said display device.

11. The program product according to claim 10, wherein, at an arbitrary location in a display area for a section that is opened and displayed, the function that is implemented by said program as said document display controller displays a command button for entering a command to close the display of said section.

12. The program product according to claim 10, wherein, for said display area for said section that has been opened and displayed, said function that is implemented by said program as said document display controller displays a message stating said section has been opened and giving a range of an expansion.

13. A display control method comprising:
    displaying document data that includes a plurality of sections in a window on a display device, each of the plurality of sections having a corresponding display area;

displaying a structure of said document data as a tree structure in which the plurality of sections are employed as nodes in a section navigator screen that is distinct from the window;

accepting an instruction for changing a size of one of the plurality of display areas that currently is displayed;

moving, in accordance with said instruction, a document segment located above or under said section; and displaying, in a display area for which the size has been changed by moving said document segment, a document segment for the section in accordance with a number of display lines that are available.

14. The display control method according to claim 13, further comprising:

in said display area wherein said document segment for said section is displayed, presenting a message stating that said section has been opened and giving a range of an expansion.

* * * * *